(12) United States Patent
Sarin et al.

(10) Patent No.: US 11,225,702 B2
(45) Date of Patent: Jan. 18, 2022

(54) PLATINUM GROUP METALS RECOVERY

(71) Applicant: THE BOARD OF REGENTS FOR OKLAHOMA STATE UNIVERSITY, Stillwater, OK (US)

(72) Inventors: Pankaj Sarin, Tulsa, OK (US); David K. Nichols, Duncan, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 488 days.

(21) Appl. No.: 16/353,831

(22) Filed: Mar. 14, 2019

(65) Prior Publication Data

US 2019/0284660 A1    Sep. 19, 2019

Related U.S. Application Data

(60) Provisional application No. 62/643,230, filed on Mar. 15, 2018.

(51) Int. Cl.
| | | |
|---|---|---|
| *B01J 23/96* | (2006.01) | |
| *C22B 11/00* | (2006.01) | |
| *B01J 38/60* | (2006.01) | |

(52) U.S. Cl.
CPC ............. *C22B 11/048* (2013.01); *B01J 23/96* (2013.01); *B01J 38/60* (2013.01)

(58) Field of Classification Search
CPC ........ C22B 11/04; C22B 11/048; B01J 23/96; B01J 38/60
USPC .......................................................... 423/22
See application file for complete search history.

(56) References Cited

U.S. PATENT DOCUMENTS

| | | |
|---|---|---|
| 5,160,711 A | 11/1992 | Atkinson et al. |
| 5,542,957 A | 8/1996 | Han et al. |
| 7,067,090 B2 | 6/2006 | Han et al. |
| 7,740,685 B2 | 6/2010 | Holgersen |
| 8,662,310 B2 | 3/2014 | Murray |
| 2008/0282842 A1 | 11/2008 | Holgersen |
| 2008/0282843 A1 | 11/2008 | Holgersen |

FOREIGN PATENT DOCUMENTS

| | | |
|---|---|---|
| WO | 2003010346 | 2/2003 |
| WO | 2003056043 | 7/2003 |

*Primary Examiner* — Edward M Johnson
(74) *Attorney, Agent, or Firm* — McAfee & Taft

(57) ABSTRACT

The disclosed methods are utilized for recovering a high percent of platinum group metals from spent catalytic converters. The methods use an aqua regia bath and ultrasonic agitation to liberate the metals from the carrier material of the washcoat, while leaving the metal supporting structure largely intact.

15 Claims, 5 Drawing Sheets

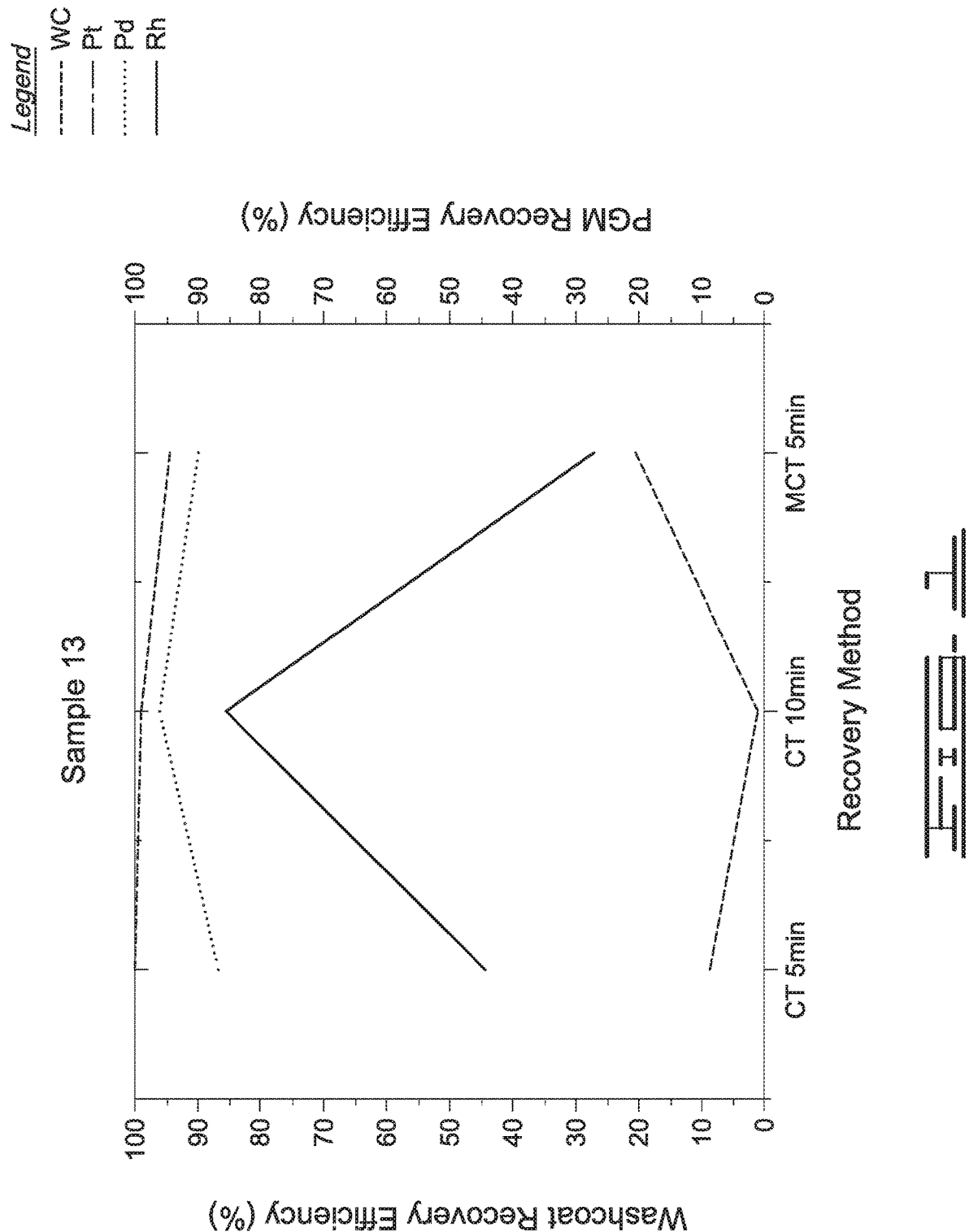

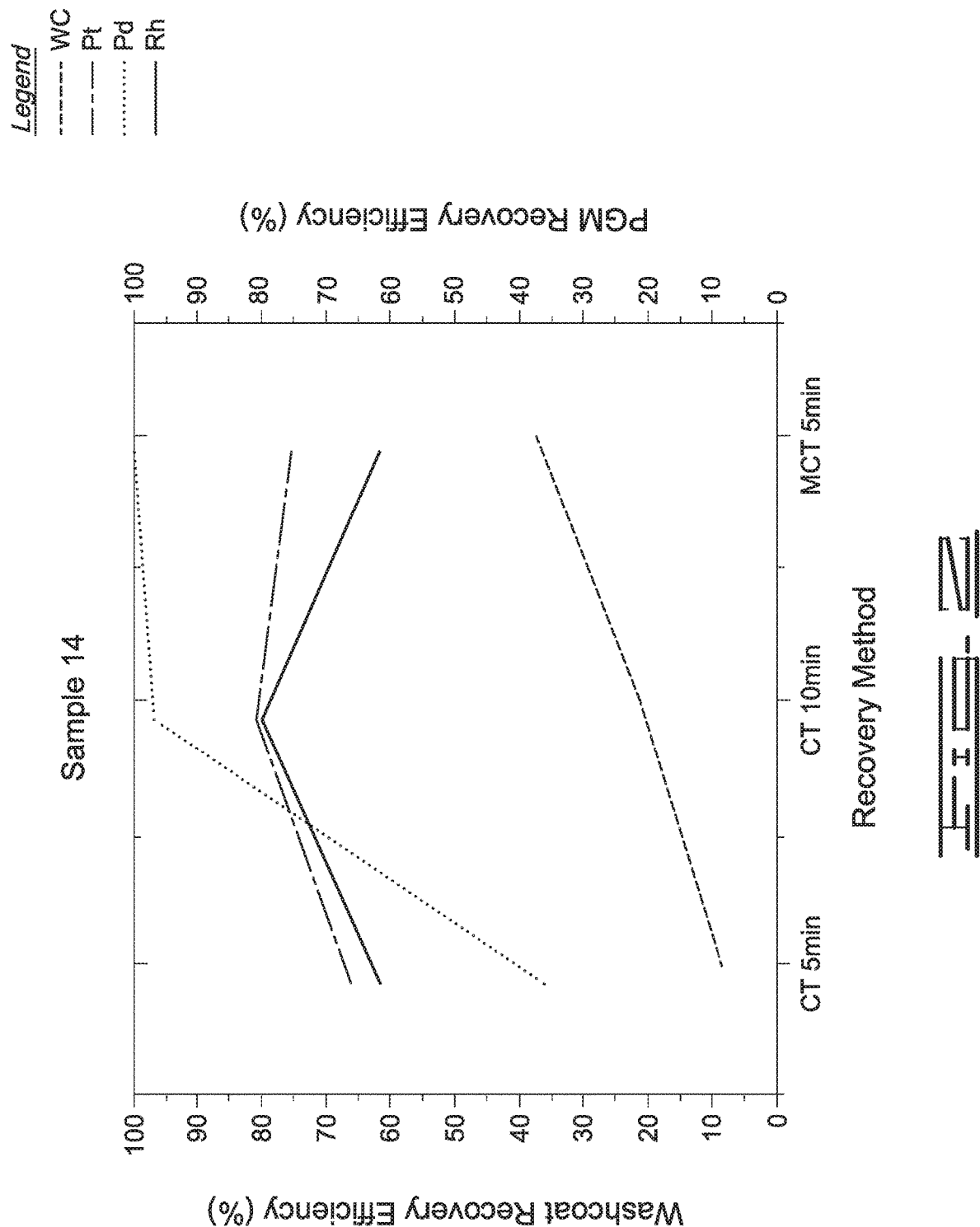

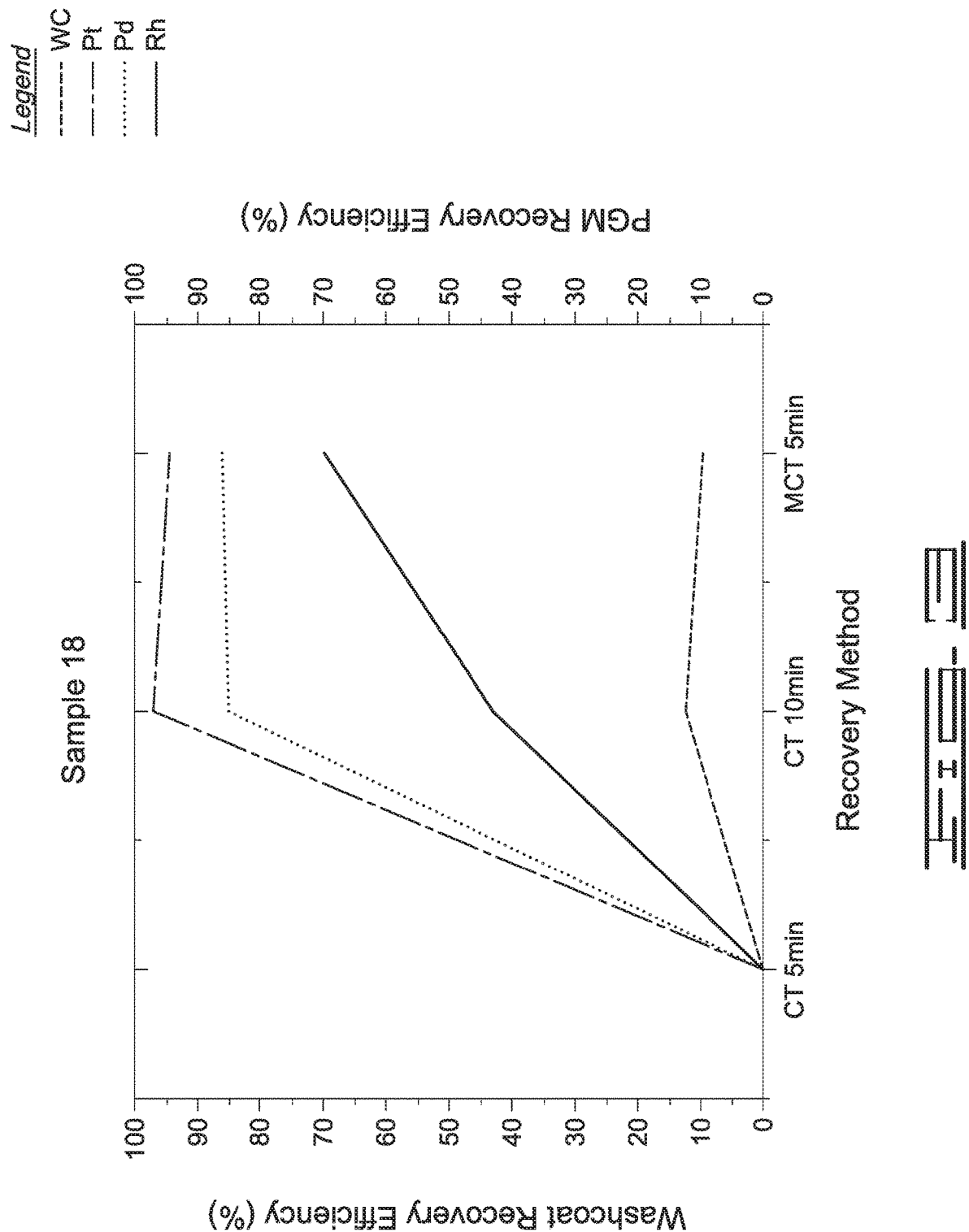

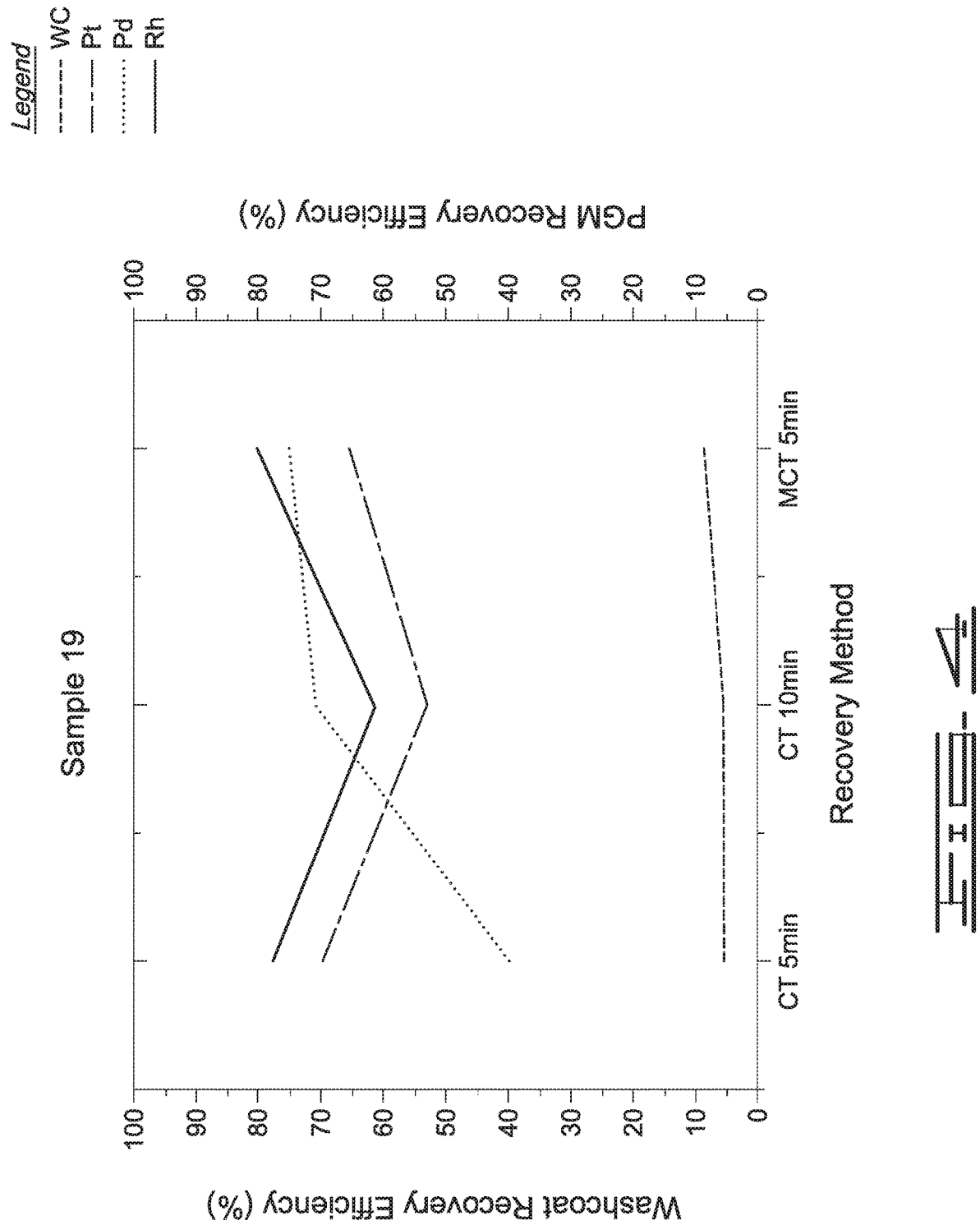

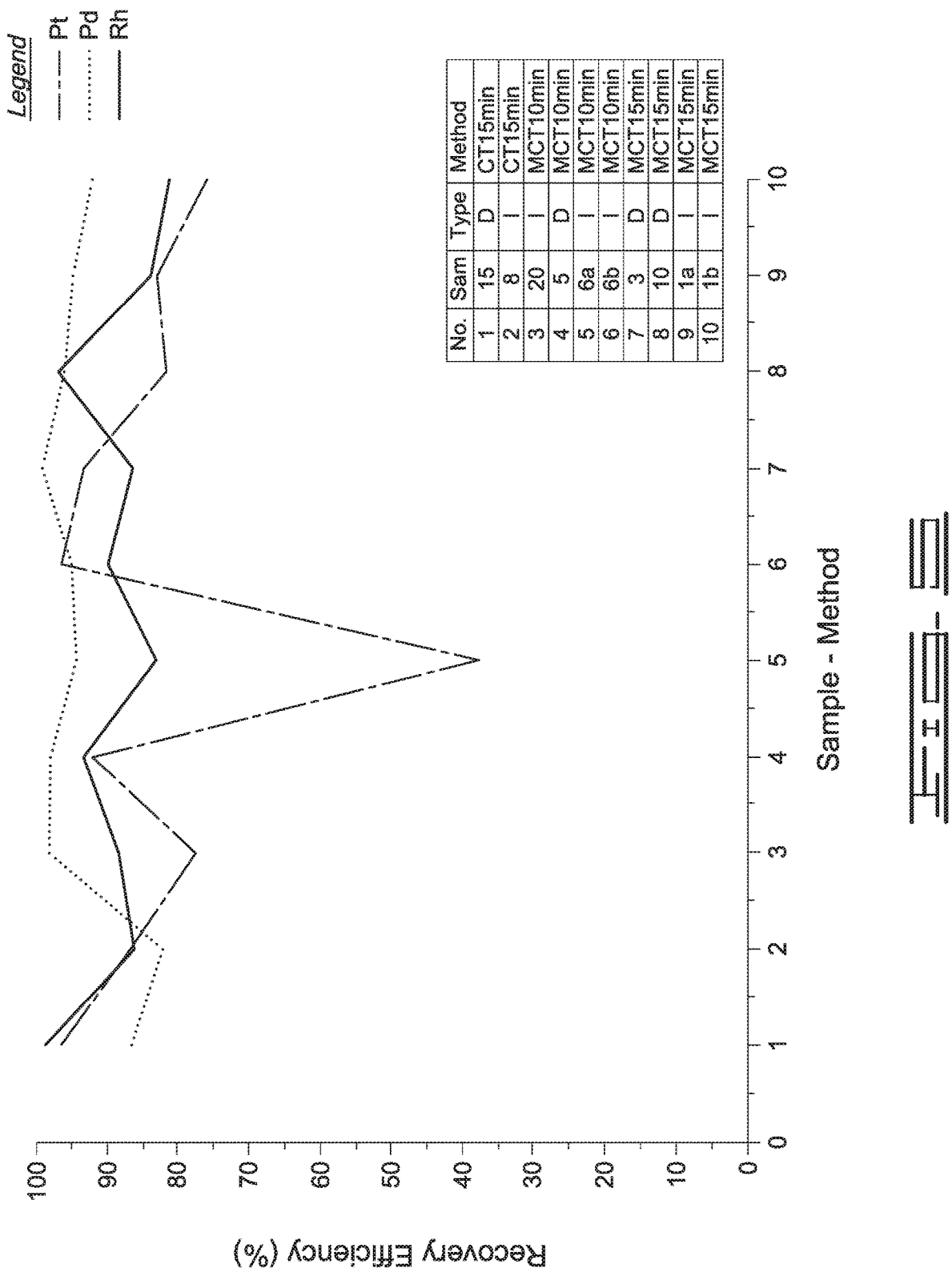

PLATINUM GROUP METALS RECOVERY

CROSS-REFERENCE TO RELATED APPLICATION

This application claims the benefit of U.S. Provisional Application No. 62/643,230 filed Mar. 15, 2018, which is hereby incorporated by reference.

FIELD

This disclosure generally relates to recovery of platinum group metals, and more particularly, to recovery of platinum group metals from used or spent catalytic converters.

BACKGROUND

Transportation is one of the main factors contributing to air pollution. It can be a major source for harmful gases such as carbon monoxide and nitrogen oxides, and even hydrocarbons into our air. To prevent emission of these harmful compounds, strict requirements have been imposed on the automotive industry, which have mandated the installation of catalytic converters in automobiles since the 1970s. An automobile catalytic converter is a vehicular emission control device that contains chemically active platinum group metals (PGM) catalysts. PGM in the catalytic converter have the ability to convert harmful pollutants in the exhaust gas into less toxic ones by catalyzing redox reactions.

Ceramic monolith catalytic converters were introduced as a replacement for coated pellet material but they were limited in their performance and efficiency. Metal foil converters—ones using a metal supporting structure to hold a washcoat comprising PGM in a carrier material—were developed at the end of the eighties. They offered a significant advantage in improved specific geometric surface area of the PGM catalyst. Hence metal foil converters with reduced volume showed same efficiency as large volume ceramic converters.

The automotive catalysts in the vehicular exhaust can last through about 4-5 years of operation. As there are no alternatives to PGM catalysts and PGM have limited worldwide availability, the need for recycling of PGM is now greater than ever. The technologies used for the recovery of PGM from ceramic substrate catalytic converters is already mature, and boasts of >99% PGM recovery efficiencies. However, the same is not true for the metal-foil based catalytic converters, and current technologies are able to recover approximately 80% of PGM.

The recycling processes that are in use in various industries for the recovery of PGM can be categorized into (a) mechanical and magnetic separation methods, and (b) chemical methods. While the mechanical and magnetic separation methods are easy to scale up and are widely used in industry, they are extremely inefficient. Chemical methods are more efficient but are severely limited for application on a larger scale. Additionally, to be attractive on an industrial scale, chemical methods must limit carrier material and iron from the metal support being included with the recovered PGM. Hence, there is a strong need for a new technology for efficient and improved recovery of PGM from used metal foil based autocatalytic converters.

SUMMARY OF THE INVENTION

Embodiments of this disclosure relate to methods for recovering a high percent of platinum group metals from spent catalytic converters. Broadly, the methods use an aqua regia bath and ultrasonic agitation to liberate the metals from the carrier material of the washcoat, while leaving the metal supporting structure largely intact.

More specifically, in some embodiments, the method is for recovering platinum group metal (PGM) from a washcoat deposited on a metal supporting structure of a catalytic converter, wherein the washcoat contains PGM and a carrier material. The method of these embodiments comprise the steps of:

contacting the washcoat deposited on the metal supporting structure with aqua regia during ultrasonic agitation—typically, at temperatures less than 100° C.—for a period of time sufficient to dissolve PGM into the aqua regia to produce a recovery mixture which contains less than 50% of the carrier material from the washcoat, and wherein at least a portion of the metal supporting structure remains after this contacting step; and recovering at least a portion of the PGM from the recovery mixture.

In the method, the step of recovering at least a portion of the PGM can comprise:

separating the metal supporting structure from the recovery mixture;

removing carrier material solids from the recovery mixture; and heating the recovery mixture from which carrier material solids have been removed so as to precipitate PGM.

Also, in some of the embodiments, the method can further comprise:

rinsing the thus separated metal supporting structure with water during ultrasonic agitation to produce a wash mixture; and adding the wash mixture to the recovery mixture prior to recovering the at least a portion of the PGM from the recovery mixture.

In some of the above embodiments, the recovery mixture contains less than 30%, less than 20% or less than 10% of the carrier material after the period of time. Also, in some of the above embodiments, at least 80%, or at least 90%, of the PGM in the washcoat are recovered in the step of recovering at least a portion of the PGM from the recovery mixture. More typically, the PGM includes at least one metal selected from the group consisting of platinum, rhodium and palladium, and at least 95%, or at least 98%, of the at least one metal is recovered in the step of recovering at least a portion of the PGM from the recovery mixture.

The aqua regia generally comprises about a 3 to 1 ratio or less of HCl to $HNO_2$, and more typically, about a 3 to 1 ratio of HCl to $HNO_2$.

BRIEF DESCRIPTION OF THE DRAWINGS

The description and embodiments are discussed with reference to the following figures.

FIG. 1 is a graph of PGM and washcoat ($Al_2O_3$) recovery with respect to the recovery methods for sample 13 of Example 1.

FIG. 2 is a graph of PGM and washcoat ($Al_2O_3$) recovery with respect to the recovery methods for sample 14 of Example 1.

FIG. 3 is a graph of PGM and washcoat ($Al_2O_3$) recovery with respect to the recovery methods for sample 18 of Example 1.

FIG. 4 is a graph of PGM and washcoat ($Al_2O_3$) recovery with respect to the recovery methods for sample 19 of Example 1.

FIG. 5 is a graph of PGM recovery efficiency for various samples in Example 2.

DESCRIPTION

The present disclosure may be understood more readily by reference to the following description. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

This disclosure relates to methods for recovering a high percent of platinum group metals from spent catalytic converters. Many vehicles have a close-coupled catalytic converter that is located near the engine's exhaust manifold. The exhaust gases are fed through the exhaust train of the catalytic converters at a high speed. The catalytic converter of interest to this disclosure is made up of a metal canister with PGM catalyst, which is placed inside a steel shell. Thus, the catalytic converter is composed of a metal supporting structure (also called a metal foil) having a washcoat. The washcoat comprises a carrier material (typically $Al_2O_3$) for the catalyst material (PGM). The structure of the substrate and the surface enlarging washcoat ensures that a large reactive surface of the catalyst is available to convert the exhaust gases into less toxic ones. Geometrical surface area of the catalyst plays a major role in determining the catalyst efficiency.

Generally, the metal foils are made up of iron-chromium-aluminum alloys of high thermal durability. These foils are corrugated to have a continuous honeycomb structure with parallel square channels of elliptical cross-section.

The washcoat is usually made up of thin layer of alumina ($Al_2O_3$), and acts as a carrier for catalyst material. The catalytic materials are mixed in the washcoat slurry before it is applied to the substrate and subsequently fired at high temperatures. This produces a high porosity coat with a higher active catalytic surface area available to react with the engine exhaust than would be provided by the metal foil without the washcoat.

The catalyst material used in catalytic converters is a mixture of precious metals usually referred to as the platinum group metals (PGM). PGM includes platinum (Pt), palladium (Pd), rhodium (Rh), ruthenium (Ru), osmium (Os) and iridium (Ir). While the catalyst material can include all or a portion of these, most commonly, the catalyst material is comprised of platinum, palladium and rhodium. The PGM have the capacity to convert toxic pollutants into benign ones due to their catalytic activity. Platinum is the most active catalyst, but unwanted additional reactions and the high cost of PGM limits PGM's wide application. Therefore, the precious metals are supplemented by base metal promoters (i.e. Ni, Co and Ce) which can reduce the cost and sustain PGM catalytic performance. Platinum and palladium helps in the oxidation of CO, NO and hydrocarbons, whereas rhodium is used as a reduction catalyst and it reduces the NOx gas. The PGM particles are uniformly dispersed in the external layer of alumina washcoat. Generally, its composition consists of up to 41.2% total rhodium, 38.1% total palladium and 20.6% of the total platinum (weight ratio). The content of PGM in a scrapped/spent catalytic converter varies commonly in ranges of about 0.5-0.95 g of Pt, 1-5 g of Pd and 0.2-0.7 g of Rh on the metal foil.

Recovery of PGM from scrapped or spent catalytic converters can be accomplished by the methods of this disclosure so as to recover a high percentage of platinum group metals from spent catalytic converters. Broadly, the methods use an aqua regia bath and ultrasonic agitation to liberate the metals from the carrier material of the washcoat, while leaving the metal supporting structure largely intact.

More specifically, a metal foil from a spent catalytic converter is introduced into a tank or zone where it is contacted with aqua regia during ultrasonic agitation. Aqua regia is a mixture of nitric acid and hydrochloric acid, typically in a molar ratio of about 3 to 1 (3:1) of HCl to $HNO_2$. However, in some embodiments the ratio can be 3 to 1 ratio (3:1) or less of HCl to $HNO_2$ but typically above 1 to 1.

Mechanical force is applied to the metal foil system through ultrasonication during the dissolution in the aqua regia. The ultrasonication imparts micro agitation and hastens the separation. The ultrasonic agitation or ultrasonication is at a high frequency (>20 KHZ), which is irradiated into the liquid (aqua regia solution) containing the metal foil to effect agitation. Sound waves are generated by an ultrasonicator and are propagated into the liquid resulting in the formation of alternative compression (high pressure) and rarefaction (low pressure) cycles. Small bubbles or voids are created in the liquid during the rarefaction process and they collapse violently leading to the cavitation effect. While not wishing to be bound by theory, it is currently believed that this cavitation effect is capable of injecting liquid jets into the metal foil thereby enhancing the dissolution of PGM and the larger mass of washcoat into the AR solution. This process is capable of creating agitation and very high local temperatures within the liquid. For the PGM recovery, the agitation effect and the cleaning application of ultrasonication energy are utilized to dislodge the washcoat layer containing the PGM from the metal foil substrate. Thus, this mechanical effect of the ultrasonication energy is applied to speed up the PGM dissolution from the washcoat and the metal foil substrate.

The contacting and ultrasonic agitation can be carried out at any suitable temperature. Generally, the temperature will be from about 50° C. to about 120° C., but more typically, from 60° C. to 100° C., such as about 90° C. An advantage of the current method is that it can use relatively short times for contacting the metal foil with aqua regia so as to limit the amount of dissolution of iron (and other non-PGM metals) from the metal foil into the liquid (aqua regia solution) and to limit the amount of catalyst carrier (typically $Al_2O_3$) removed from the metal foil. Typically, a predetermined period of time for contacting is used, which is sufficient to dissolve PGM into the aqua regia to produce a recovery mixture which contains at least 80% of the total PGM contained in the washcoat of the spent catalytic converter, less than 50% of the carrier material from the washcoat, and wherein at least a portion of the metal supporting structure remains after the contacting with the aqua regia. More specifically, the recovery mixture can contain less than 30%, less than 20% or less than 10% of the carrier material after the period of time for contact. Also, at least 90% of the total PGM in the washcoat are dissolved into the aqua regia in the period of time so that at least 90% of the total PGM will be recovered. In some embodiments where the PGM includes at least one metal selected from the group consisting of platinum, rhodium and palladium, at least 95%, or at least 98%, of the at least one metal is dissolved into the aqua regia solution and recovered as discussed below.

The contacting with aqua regia during ultrasonic agitation results in a recovery mixture containing portions of the catalyst carrier and dissolved PGM. After contacting and ultrasonic agitation for the predetermined period of time, at least a portion of the PGM is recovered from the recovery mixture. Typically, the remaining metal supporting structure (metal foil) is first removed from the recovery mixture. The carrier material solids are then separated from the recovery mixture, such as by filtration—for example vacuum filtration—or other suitable means. The recovery mixture can then be treated to recover the PGM metals. For example, the recovery mixture can be treated with ammonium chloride solution and heated to produce a precipitate. The precipitate can then be dried and further treated to produce the metals. For example, the precipitate can be strongly heated (~900° C.) to yield a pure platinum product and/or iridium. Other known processes can be used to retrieve substantially pure PGM metals from the precipitate.

In some applications of the process, the metal foil taken from the recovery mixture is rinsed with water to recover additional PGM materials in the wash water. In certain preferred embodiments, the rinsing with water is performed with ultrasonic agitation to ensure that all the PGM is removed from the metal foil. The resulting wash mixture can be added to the recovery mixture prior to recovering PGM or can be separately treated to recover PGM.

EXAMPLES

The above methods and apparatuses, and systems incorporating them, can be better understood by the following examples, which support and illustrate various embodiments.

Example 1

Foils from four spent catalytic converters were tested using a chemical treatment and a mechano-chemical treatment. The foils were cut so that a section of the foil could be used in each test.

In the chemical treatment (CT), a section of each of the metal-foil samples were subjected to immersion in an aqua regia solution at 90° C. for 5 while stirring at 300 rpm, and a second section of each of the metal-foil samples were subjected to immersion in an aqua regia solution for 10 minutes while stirring at 300 rpm. The stirring enables uniform mass transfer and maintains uniform temperature. No ultrasonic agitation was used.

In the mechano-chemical treatment (MCT), a third section of each of the metal-foil samples were immersed in aqua regia solution at 90° C. for 5 minutes with simultaneous ultrasonication.

In either of the methods, the section of metal foil was suspended in the aqua regia solution using a fiberglass net. After the specific time periods, the foils were removed from the acid media with the help of fiberglass net and washed with deionized (DI) water. The entire process was carried out in a fume hood to make sure that the NOx gas liberated during the dissolution escaped out of the hood. The foils were subjected to ultrasonication in DI water for 10 minutes to make sure that all PGM is removed from them. Later, this solution was added to the aqua regia mixture and then neutralized to remove nitric acid. The washcoat residue was separated from aqua regia mixture by vacuum filtration and calcined at 500° C. to remove organic impurities.

To separate out a platinum precipitate from the filtrate, saturated ammonium chloride solution was added to form ammonium (hexa) chloroplatinate precipitate, which was separated by filtration. The precipitate was dried in a vacuum oven at 120° C. overnight and then heated at 900° C. for three hours to get metallic Pt.

In the case of the mechano-chemical treatment, the only variation was the time of contact with the aqua regia solution and utilization of mechanical energy in the form of ultrasonication to dissolute the PGM and washcoat layer in the aqua regia solution within a shorter span of time. The sound waves generated by the ultrasonicator propagated into the aqua regia solution containing metal foil thereby creating alternative compression and rarefaction cycles.

The results of the 5 min chemical treatment, 10 min chemical treatment and 5 min mechano-chemical treatment are shown in Tables 1-3.

TABLE 1

| | | CT for 5 min. | | | |
|---|---|---|---|---|---|
| Catalytic Converter ID | Mass of Catalytic Converter | Total Weight of Pt (g) | Total Weight of Washcoat (g) | Weight of Pt Extracted | Weight of Washcoat Extracted (g) |
| #13 | 395.91 | 6.1 | 52 | 4.6 | 4.1 |
| #14 | 367.46 | 0.9 | 75 | 0.7 | 6.0 |
| #18 | 520.27 | 2.1 | 140.9 | 1.4 | 6.9 |
| #19 | 575.55 | 2.2 | 259.8 | 1.9 | 11.8 |

TABLE 2

| | | CT for 10 min. | | | |
|---|---|---|---|---|---|
| Catalytic Converter ID | Mass of Catalytic Converter | Total Weight of Pt (g) | Total Weight of Washcoat (g) | Weight of Pt Extracted | Weight of Washcoat Extracted (g) |
| #13 | 395.91 | 0.6 | 71.3 | 0.6 | 7.6 |
| #14 | 367.46 | 1.0 | 97.1 | 0.7 | 16.6 |
| #18 | 520.27 | 2.5 | 158.2 | 2.0 | 15.7 |
| #19 | 575.55 | 2.1 | 271 | 1.7 | 13.0 |

TABLE 1

| | | CT for 5 min. | | | |
|---|---|---|---|---|---|
| Catalytic Converter ID | Mass of Catalytic Converter | Total Weight of Pt (g) | Total Weight of Washcoat (g) | Weight of Pt Extracted | Weight of Washcoat Extracted (g) |
| #13 | 395.91 | 1.1 | 83.0 | 1.1 | 14.7 |
| #14 | 367.46 | 0.7 | 111.2 | 0.7 | 32.6 |
| #18 | 520.27 | 2.8 | 233 | 2.3 | 18.4 |
| #19 | 575.55 | 0.8 | 286.3 | 0.7 | 18.7 |

Based on the wet chemistry results (Table 1 to 3), it was observed that even if the washcoat is not completely recovered from the metal foil, PGM can be extracted in the aqua regia solution. The PGM recovery efficiency increased with increase in the time period in the case of chemical treatment, whereas the MCT-5 min and CT-10 min treatments showed comparable results with high efficiency. With the application of mechanical effect during the chemical treatment, the time of acid exposure to the converter foil can be reduced thereby reducing the processing time.

The above analysis is limited to the calculation of Pt recovery efficiency as it focused only on the solvent extraction of Pt leaving other PGM in the AR solution. The total PGM recovery of each method was assessed by the measurement of PGM content in the aqua-regia solution removed washcoat, Pt precipitate and deionized water (used in washing the auto catalyst). Therefore, quantitative analysis was done using XRF and ICP spectroscopy on these samples to check the content of trace metals (PGM-Pt, Pd, Rh) in the residue, precipitate and filtrate. The treated metal foil was subjected to complete digestion to check if PGM was still present in them. Finally, the recovery efficiency in percentage was calculated by the following formula.

$$\text{Recovery Effiency (\%)} = \frac{(PGMs \text{ recovered by } CT/MCT \text{ method}) \times 100}{(PGMs \text{ recovered by } CT/MCT + PGMs \text{ remaining in treated metal foil})}$$

The resultant recovery efficiencies in percentage are shown in Table 4 and illustrated in the graphs of FIGS. 1-4.

TABLE 4

| Treatment method | Recovery Efficiency (%) | | | | | | | | | | | |
|---|---|---|---|---|---|---|---|---|---|---|---|---|
| | #13 | | | #14 | | | #18 | | | #19 | | |
| | Pt | Pd | Rh | Pt | Pd | Rh | Pt | Pd | Rh | Pt | Pd | Rh |
| CT 5 min | 99.8 | 86.8 | 44.4 | 66.3 | 36.2 | 61.6 | 0.5 | 0.8 | 0.4 | 69.8 | 40 | 78 |
| CT 10 min | 99.3 | 96.2 | 85.6 | 80.9 | 96.6 | 80.1 | 97.2 | 85.2 | 43.2 | 53.1 | 70.6 | 60.8 |
| MCT 5 min | 94.5 | 89.9 | 26.9 | 75.5 | 99.9 | 62.1 | 94.4 | 86.4 | 69.9 | 65.7 | 74.9 | 80 |

From Table 4 and FIGS. 1-4, the graphs, the efficiency numbers vary irrespective of the samples and techniques used. It is also seen that the PGM extraction is not uniform in different samples. PGM mass along with the washcoat was larger than the benchmarked values. This difference can be attributed to the variability in the PGM and washcoat ($Al_2O_3$) content between the different segments of the same used metal foil. The variability includes properties such as microstructure and composition of the used metal foil and efficiency of PGM recovery and washcoat removal. This variability does not affect the significance of the recovered results by the above techniques but it necessitates that the assessment of PGM recovery efficiency by the developed process will be most meaningful if determined from the entire metal-foil sample. Additionally, the efficiency shows that substantial PGM can be recovered without complete digestion of the metal foil and without complete removal of the washcoat from the metal foil.

Example 2

Converter foils were procured from the metal foil substrates by means of plasma cutting technique and initial weights were measured. Unlike Example 1, the metal foils were not sectioned into various quarters and were used in whole for either chemical treatment or mechano-chemical treatment in aqua regia solution. The chemical treatment process was performed on a domestic and an international sample for a time period of 15 minutes based on the theoretical estimation that all the PGM would be dispersed in acid during that time period as compared to 5 and 10 minutes used in Example 1. The mechano-chemical treatment process involving acid along with constant ultrasonication was tested on the remaining samples (domestic and international) at two different time periods (t=10 minutes and 15 minutes). Table 5 indicates classification of samples based on the recovery technique applied.

TABLE 5

| Catalytic Converter ID | Type | Treatment | Time (min) |
|---|---|---|---|
| 8 | International | CT | 15 |
| 15 | Domestic | CT | 15 |
| 5 | Domestic | MCT | 10 |
| 6a | International | MCT | 10 |
| 6b | International | MCT | 10 |
| 20 | International | MCT | 10 |
| 3 | Domestic | MCT | 15 |
| 10 | Domestic | MCT | 15 |
| 1a | International | MCT | 15 |
| 1b | International | MCT | 15 |

Certain converters were of a three-way type and had two honeycomb structures in them. In such cases, the metal foils were subjected to similar treatment technique to compare and analyze the PGM composition and recovery efficiency (6a and 6b, and 1a and 1b).

The precipitation step was not performed in this Example 2. Thus, entire PGM were concentrated in the aqua regia solution and were eliminated from the metal foils. To verify this, the treated metal foils were dried in a vacuum oven at 120° C. overnight and complete digestion was performed after the above CT and MCT procedures.

Following Table 6 represents the weight of washcoat removed from the metal foil samples through the CT and MCT treatments.

TABLE 6

| Catalytic Converter ID | Treatment | Mass of Catalytic Converter (g) | Total Weight of Washcoat (g) | Weight of Washcoat Extracted (g) | Theoretical Washcoat Recovery Efficiency (%) |
|---|---|---|---|---|---|
| 8 | CT-15 min | 407.2 | 200.28 | 29.5 | 12.8 |
| 15 | CT-15 min | 466.5 | 210.99 | 14.5 | 6.4 |
| 5 | MCT-10 min | 696.5 | 195.45 | 20.84 | 9.6 |
| 6a | MCT-10 min | 622.45 | 219.84 | 24.03 | 9.9 |
| 6b | MCT-10 min | 1113.5 | 306.7 | 36.27 | 10.6 |
| 20 | MCT-10 min | 890.2 | 285.1 | 39.41 | 12.2 |
| 3 | MCT-15 min | 732.8 | 195.45 | 20.84 | 9.6 |
| 10 | MCT-15 min | 1346 | 219.84 | 24.03 | 9.9 |
| 1a | MCT-15 min | 1057.9 | 306.7 | 36.27 | 10.6 |
| 1b | MCT-15 min | 577.7 | 285.1 | 39.41 | 12.2 |

The washcoat samples and the filtrate samples were analyzed for trace metal (Pt, Pd & Rh) composition using XRF and ICP spectroscopy, respectively. The recovery efficiency was calculated for Pt, Pd and Rh as shown in Table 6 and is graphically represented in FIG. 5.

TABLE 6

| Treatment method | Recovery Efficiency (%) | | |
| --- | --- | --- | --- |
| | Pt | Pd | Rh |
| C.T 15 min; #15 Domestic | 96.6 | 86.7 | 98.9 |
| C.T 15 min; #8 International | 86.9 | 82.4 | 86.4 |
| M.C.T 10 min; #20 International | 77.8 | 98.3 | 88.5 |
| M.C.T 10 min; #5 Domestic | 92.3 | 98.1 | 93.5 |
| M.C.T 10 min; #6a International | 37.7 | 94.5 | 83.4 |
| M.C.T 10 min; #6b International | 96.3 | 95.2 | 90.0 |
| M.C.T 15 min; #3 Domestic | 93.6 | 99.3 | 86.6 |
| M.C.T 15 min; #10 Domestic | 82.0 | 96.1 | 97.1 |
| M.C.T 15 min; #1a International | 83.1 | 95 | 83.9 |
| M.C.T 15 min; #1b International | 76.3 | 92.3 | 81.4 |

The efficiency data indicates recovery efficiency is comparatively higher in domestic samples when compared to the international ones. This change can be attributed to the difference in loading technique and amount of PGM loaded between the international and domestic samples. On comparison of the two recovery techniques applied, it is seen that the mechano-chemical technique (i.e. acid treatment combined with ultrasonication) yields better efficiency values as compared to the chemical treatment. Even though a small percentage of washcoat was removed from the metal foil, the recovery of PGM was near or greater than 90%. Hence, the current method separates the PGM from the metal foil easily as compared to the washcoat layer. The mechanical effect of ultrasonication thus enables to dislodge PGM from the washcoat surface and dissolve them in the acid solution within a short span of time.

The above examples illustrate that dissolution in aqua regia with ultrasonication is an effective way to extract PGM from the used metal foil of catalytic converters. High efficiency in the recovery of PGM from the used metal foils was achieved (>95%) using both the CT (15 min) and MCT (10 min) methods. The addition of mechanical force through ultrasonication in the MCT enhanced PGM recovery when compared with the CT method for the same time of treatment. Additionally, a high percentage of PGM were recovered even though the washcoat removal was insignificant, and the metal foils were largely intact after CT/MCT treatment.

The methods of the current disclosure have been described in reference to the specific embodiments described and illustrated in the figures; however, the embodiments are not meant to be limited to those specific embodiments. As will be apparent to those skilled in the art, features of one embodiment are capable of being used in one of the other embodiments as long as they do not directly conflict with elements of the other embodiment.

While methods are described in terms of "comprising," "containing," or "including" various components or steps, the compositions and methods also can "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method for recovering platinum group metal (PGM) from a washcoat deposited on a metal supporting structure of a catalytic converter, wherein the washcoat contains PGM and a carrier material, the method comprising the steps of:
   contacting the washcoat deposited on the metal supporting structure with aqua regia during ultrasonic agitation for a period of time sufficient to dissolve PGM into the aqua regia to produce a recovery mixture which contains less than 50% of the carrier material from the washcoat, and wherein at least a portion of the metal supporting structure remains after this contacting step; and
   recovering at least a portion of the PGM from the recovery mixture.

2. The method of claim 1, wherein after the period of time, the recovery mixture contains less than 30% of the carrier material.

3. The method of claim 1, wherein after the period of time, the recovery mixture contains less than 20% of the carrier material.

4. The method of claim 1, wherein after the period of time, the recovery mixture contains less than 10% of the carrier material.

5. The method of claim 1, wherein at least 80% of the PGM in the washcoat are recovered in the step of recovering at least a portion of the PGM from the recovery mixture.

6. The method of claim 1, wherein at least 90% of the PGM in the washcoat are recovered in the step of recovering at least a portion of the PGM from the recovery mixture.

7. The method of claim 1, wherein the contacting is carried out at a temperature below 100° C.

8. The method of claim 1, wherein the PGM includes at least one metal selected from the group consisting of platinum, rhodium and palladium, and wherein at least 95% of the at least one metal is recovered in the step of recovering at least a portion of the PGM from the recovery mixture.

9. The method of claim 1, wherein the PGM includes at least one metal selected from the group consisting of platinum, rhodium and palladium, and wherein at least 98% of the at least one metal is recovered in the step of recovering at least a portion of the PGM from the recovery mixture.

10. The method of claim 8, wherein after the period of time, the recovery mixture contains less than 20% of the carrier material.

11. The method of claim 1, wherein the aqua regia comprises about a 3 to 1 ratio or less of HCl to $HNO_2$.

12. The method of claim 1, wherein the step of recovering at least a portion of the PGM comprises:
   separating the metal supporting structure from the recovery mixture;
   removing carrier material solids from the recovery mixture; and
   heating the recovery mixture from which carrier material solids have been removed so as to precipitate PGM.

13. The method of claim 11, further comprising:
   rinsing the thus separated metal supporting structure with water during ultrasonic agitation to produce a wash mixture; and
   adding the wash mixture to the recovery mixture prior to recovering the at least a portion of the PGM from the recovery mixture.

14. The method of claim 13, wherein after the period of time, the recovery mixture contains less than 20% of the carrier material, and wherein the PGM includes at least one metal selected from the group consisting of platinum, rhodium and palladium, and wherein at least 95% of the at least one metal is recovered in the step of recovering at least a portion of the PGM from the recovery mixture.

15. The method of claim 1, wherein the aqua regia comprises about a 3 to 1 ratio of HCl to $HNO_2$.

* * * * *